March 9, 1954
R. GUNN
2,671,334
DEW OR FROST POINT INDICATOR
Filed Nov. 15, 1949
2 Sheets-Sheet 1
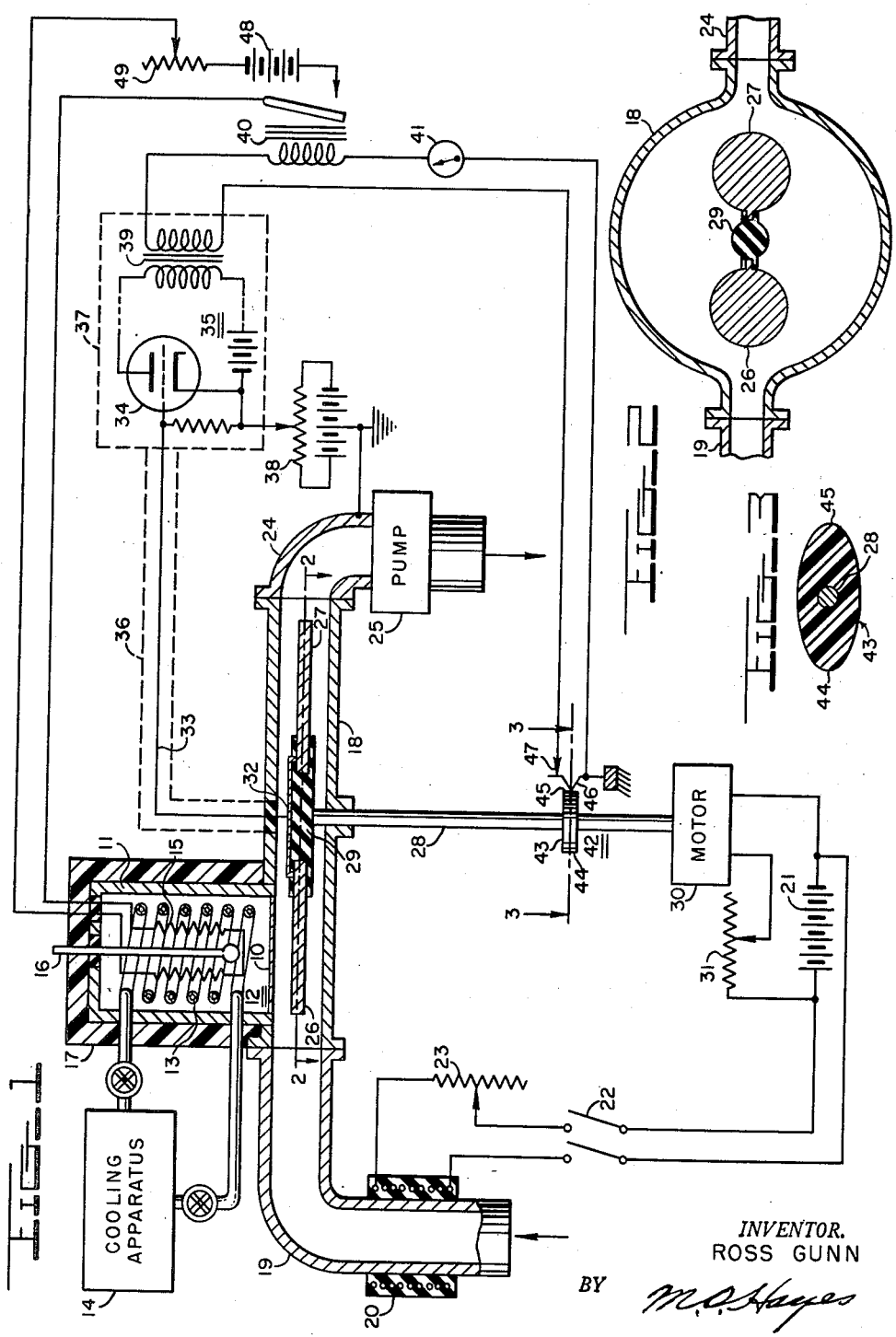
*INVENTOR.*
ROSS GUNN
BY *M. O. Hayes*

March 9, 1954
R. GUNN
2,671,334
DEW OR FROST POINT INDICATOR
Filed Nov. 15, 1949
2 Sheets-Sheet 2
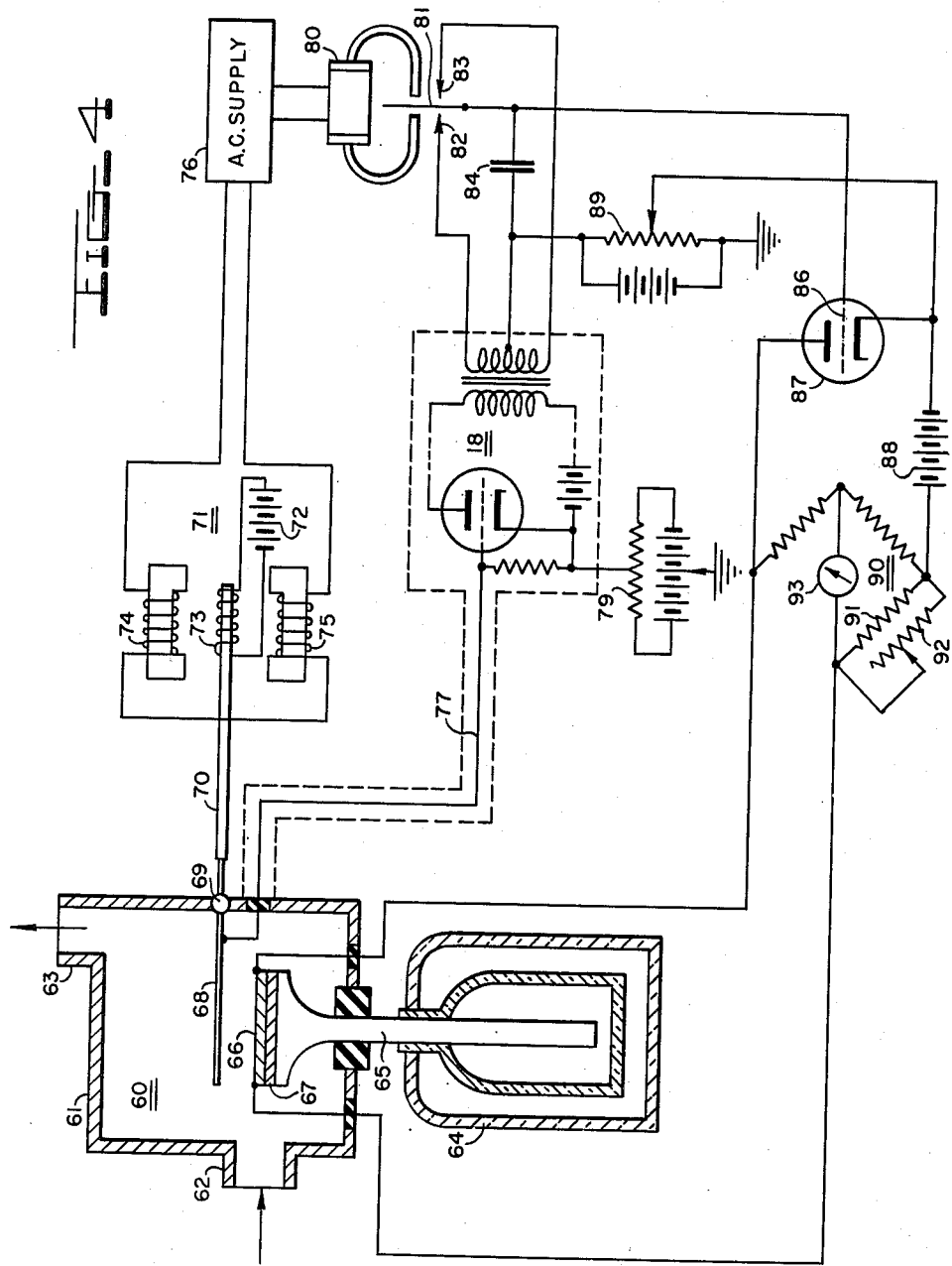
INVENTOR.
ROSS GUNN
BY
M. C. Hayes Patented Mar. 9, 1954

2,671,334

UNITED STATES PATENT OFFICE 2,671,334

DEW OR FROST POINT INDICATOR

Ross Gunn, Washington, D. C.

Application November 15, 1949, Serial No. 127,478

16 Claims. (Cl. 73—17)

(Granted under Title 35, U. S. Code (1952), sec. 266)

This invention relates to temperature measuring apparatus and more particularly to apparatus for measuring the condensation and precipitation temperatures of condensable and precipitatable gases.

Dew and frost point meters provided heretofore are incapable of producing sufficiently accurate indications to satisfy the requirements of specialized fields, such as meteorological forecasting wherein the correctness of the forecast is manifestly proportional to the accuracy of the humidity measurement available.

It is therefore an object of the present invention to provide novel means for determining condensation and precipitation temperatures.

Another object is to provide a dew or frost point meter capable of producing indications in response to formation of a single molecular layer of condensation or precipitation.

Still another object of the present invention is to provide a measuring apparatus operative in dependency on contact potentials established by the function to be measured.

Still another object is to provide a measuring apparatus capable of rapidly determining and indicating dew or frost point temperatures with absolute accuracy.

Other objects and features of the present invention will appear more fully hereinafter upon consideration of the following detailed description in connection with the accompanying drawings which disclose two embodiments of the invention. It is expressly understood however that the drawings are designed for the purpose of illustration only and not as a definition of the limits of the invention, reference for the latter purpose being had to the appended claims.

In the drawings, wherein similar reference characters denote similar elements throughout the several views:

Fig. 1 is a diagrammatic illustration, partly in section, of a measuring apparatus constructed in accordance with one embodiment of the present invention;

Fig. 2 is a sectional illustration of a portion of the apparatus illustrated in Fig. 1;

Fig. 3 is a sectional illustration through line 3—3 of Fig. 1 and

Fig. 4 is a diagrammatic illustration, partly in section, of another embodiment of the present invention.

It is contemplated by the present invention to provide a temperature measuring and indicating apparatus, particularly adapted for measuring and indicating dew and frost point temperatures, including a metallic surface subject to gas under investigation, such as the atmosphere, means for applying a cooling effect to the surface to reduce the temperature thereof to a value below the saturation temperature of the gas, a heating means for the surface, and a control circuit including contact potential measuring means for controlling the heating means in response to formation of a single molecular layer of condensation or precipitation on said surface so that the surface is maintained at a temperature value substantially equal to the dew or frost temperature of the gas.

The foregoing is more fully understood with reference to Figs. 1, 2 and 3 of the drawings which disclose a measuring apparatus constructed in accordance with one embodiment of the present invention. As shown, the apparatus includes a metallic plate 10, the lower surface of which comprises the sensitive area thereof. The metallic plate 10 forms the lower end, as viewed in Fig. 1, of a hollow cylindrical metallic member 11 defining a chamber 12 filled with any suitable fluid having high heat conductivity. The plate 10 is described as being in circular form, however, it is understood that metallic plates having other configurations may be readily employed. Cooling coils 13 are provided within the chamber 12 and are supplied with a cooling medium from a cooling apparatus 14 of any suitable, conventional construction. The chamber 12 also houses a resistance heating element 15 and a temperature indicator 16, such as a thermometer, for indicating the temperature of the metallic plate 10 as a function of the temperature of the fluid within the chamber 12. The metallic cylindrical member 11 is surrounded by heat insulating material 17 to nullify effects from extrinsic heat sources.

The apparatus further includes metallic cylindrical housing 18 which functions as a manifold for transferring gas under test across the lower surface of plate 10, and as a housing for the contact potential measuring means. The cylindrical member 11 is supported on the upper surface of the housing 18, as viewed in Fig. 1, with the plate 10 extended through a circular opening therein so that the lower surface thereof lies in the plane of the upper, inner surface of the housing 18. For a purpose that will appear more fully hereinafter, the cylindrical member 11 is displaced from the central, vertical axis of the housing 18.

The gas under test is fed to the cylindrical housing 18 through an input conduit 19 provided with an anti-condensation heating element 20 energized from a current source 21 through a switch 22 and a control resistor 23. A discharge conduit 24 connected to the housing 18 in diametric relation with respect to the input conduit 19, forms a connection between the housing 18 and a variable capacity circulating pump 25. The pump 25 is controlled in accordance with the capacity of the input and discharge conduits so that gas uniformly flows through the housing 18 at the normal pressure thereof.

The contact potential measuring means includes a pair of metallic vanes 26 and 27, shaped to correspond to the configurations of the plate 10, and rotatably mounted within the housing 18 in a plane spaced from and parallel to the lower surface of the metallic plate 10. The vanes 26 and 27 are rigidly mounted in diametric relation on a shaft 28 by means of a high resistance mechanical coupling device 29, and the shaft 28 is journaled in the lower wall of the housing 18 properly displaced from the surface 10 so that a projection of the surface 10 lies within the annular path of the rotating vanes. A motor 30 energized from the current source 21 and controlled by a variable resistor 31, is provided for rotating the shaft 28. The vanes are electrically connected together by means of a metallic connector 32 which also provides a contact for an output conductor 33 coupled to the input stage 34 of a multi-stage amplifier 35. The conductor 33 and the amplifier 35 are provided with electrical shielding means 36 and 37, respectively. A potentiometer device 38 controls the bias on the amplifier input stage 34. The amplifier 35, through an output transformer 39, feeds a series circuit including a relay device 40, a meter 41 and a synchronous switching device 42. The switching device 42 functions to rectify the alternating current output of the amplifier 35. The device 42 includes a cam 43, having diametric lobes 44 and 45 secured to the shaft 28 in the same angular position as the vanes 26 and 27, respectively. A spring switch member 46 is positioned adjacent the cam 43 for actuation by the lobes 44 and 45 to establish contact with a terminal 47 at the instant either the vanes 26 or 27 occupies a symmetrical position with respect to the lower surface of the plate 10. The meter 41 indicates the rectified output of the amplifier 35, and the relay 40 functions, when energized, to complete a connection from a current source 48 to the heating element 15 by way of a variable resistor 49.

The surface 10, the vanes 26, 27, the housing 18 and the shielding means 36 and 37 are constructed of similar metallic material, such as platinum for example, and the apparatus is designed so that the lower side of the plate 10 and the vanes 26, 27 may be chemically cleaned. When the lower surface of the plate 10 and the vanes 26, 27 are chemically clean and are maintained at equal potentials by adjustment of the potentiometer 38 no signal is produced upon rotation of the vanes relative to the sensitive surface. However, when a potential differential is produced, due to the presence of a single molecular layer of condensation or precipitation on the surface 10, an E. M. F. appears at the conductor 33 which is subsequently amplified and rectified.

This potential difference developed between the plates in response to the presence of dew or frost on the surface 10 is familiarly known as "contact potential." Prior art devices have not attempted to detect the contact potential produced by a single molecular layer of frost or dew, however, the occurrence of this potential difference is a familiar phenomenon in the scientific field. By the works of such men as Richardson (Philosophical Magazine Vol. 23 page 263) Compton and Langmuir (Reviews of Modern Physics Volume 2 page 136) and others, many of the unusual characteristics of a monomolecular layer of a substance upon a metallic surface have been disclosed. It has been shown that the process of emission from electrodes is greatly dependent on the surface condition as regard surface films of foreign metals or absorbed gases. The contact potential which is developed between two similar metals by the presence of another substance at the surface of one of the metals has been found to depend directly on the "work function" of the substances. As described by Oatley (Proceedings of the Royal Society, vol 155, page 218) and others, the Richardson equation $V = \phi_1 - \phi_2 + P$ where V refers to the contact potential, $\phi_1 + \phi_2$ refer to the respective work function of the two substances and P is the Peltier effect (negligible) permits an easy determination of the magnitude of the contact potential.

When it is desired to determine the dew point of a gas containing a vapor, such as the atmosphere for example, the pump 25 is adjusted to maintain uniform circulation of the atmosphere, at atmospheric pressure, through the housing 18. The heating element 20 is sufficiently energized, upon operation of the switch 22 and the control resistor 23, to prevent condensation of moisture on the internal walls of the input conduit 19, and thus preclude absorption of moisture by the atmosphere prior to its passage across the lower surface of plate 10. The motor 30 is controlled to rotate the vanes 26 and 27 at a constant velocity, and the potentiometer device 38 is adjusted to bias the input amplifier stage 34 so that, under the foregoing conditions, the amplifier produces no output signal.

The cooling apparatus 14 is then operated to sufficiently reduce the temperature of the fluid within the chamber 12 so that the temperature of the metallic plate 10 is maintained at a value below the saturation temperature of the air. When the temperature of the metallic plate 10 is below the saturation temperature of the air, condensation forms on the lower surface thereof. The presence of a single molecular layer of condensation varies the contact potential of the plate 10, and, as will appear more fully hereinafter, the contact potential measuring means is sensitive to such contact potential variations to produce an amplifiable output signal in accordance therewith. The rectified output of the amplifier 35 operates the relay device 40 to effect energization of the heater 15. Energization of the heater 15 raises the temperature of the metallic plate 10 to evaporate the condensation and terminate the contact potential signal. Upon de-energizaion of the heater 15 the cooling effect again predominates to initiate repetition of the foregoing cycle.

It is expressly understood that the apparatus functions in response to a single molecular layer of condensation, and therefore the temperature of the surface 10, and also the fluid within the chamber 12 swings about the absolute saturation temperature of the gas between limits but slightly removed therefrom. The temperature of the fluid is indicated by the thermometer 16, and this indication substantially corresponds to the absolute dew point temperature.

As stated heretofore, the contact potential measuring means possesses high sensitivity and produces signals capable of amplification in response to contact potential variations resulting from a condensation or precipitation formation having a thickness only equal to one molecular layer. It has been found that at least a quarter volt signal is produced when one molecular layer of pure water condensation is present on the surface of the plate 10, and the presence of one molecular layer of precipitation produces a five to six volt signal. These signals are readily amplified for controlling energization of the heater 15. Since the temperature of the plate 10 is increased when one molecular layer of condensation appears thereon, and since the heating effect terminates upon evaporation of the single molecular layer of condensation, it is expressly understood that the temperature of the metallic plate 10 rapidly approaches the saturation temperature of the gas under test and becomes substantially stabilized at that temperature. The apparatus is therefore capable of rapidly indicating saturation temperatures, of indicating rapidly varying saturation temperatures, and of providing an indication that may, for all practical purposes, be considered an absolute indication of saturation temperatures.

The foregoing advantages of the present invention are more fully appreciated upon consideration of the prior dew point meters, including those meters employing photo-cells and other light responsive devices for producing control signals in response to condensation formations. These meters are incapable of rapidly providing sharply defined saturation temperature indications since operation thereof necessitates the presence of a condensation formation having a thickness approaching the wave length of light, or $4 \times 10^{-5}$ centimeters, which corresponds to more than one thousand molecules of water positioned one on top of each other. The sharpness of indications produced by the present invention, as well as the time required to attain a stabilized indication, is therefore increased, with respect to the prior meters, by a factor of one thousand.

When it is desired to determine the frost point temperature of a gas the apparatus is operated in the manner described heretofore with the cooling apparatus adjusted to reduce the temperature of the metallic plate 10 to a level below the precipitation temperature, and with the relay device 40 rendered only responsive to amplified contact potential signals resulting from molecular precipitation formations. The frost point temperature indications are therefore free from ambiguity resulting from condensation formations at the precipitation temperature.

The embodiment of the invention shown in Fig. 4 of the drawings includes an arrangement for directly heating the sensitive metallic surface to evaporate condensation or precipitation in accordance with contact potential variations, and an electrical temperature indicating means for directly indicating the dew or frost point temperature as a function of the metallic surface temperature.

In particular, the Fig. 4 embodiment includes a chamber 60 defined by a closed rectangular body member 61 having an input port 62 and an output port 63 for the gas under investigation. A circulating pump, not shown, may be provided, and the size of the input and output ports are properly proportioned to maintain proper gas pressure within the chamber 60. The cooling means may comprise a Dewar flask 64 including a metallic thermal conductor 65 terminated within the chamber 60. A metallic surface 66, upon which the vapor is condensed or precipitated, is mounted adjacent the terminated end of the metallic thermal conductor 65 in heat transferring relationship, and is electrically insulated therefrom by means of a suitable insulator 67. The insulator 67 may comprise a thin sheet of mica having the upper surface thereof, as viewed in the drawing, plated with platinum or any other suitable metal to form the metallic surface 66. The contact potential measuring device includes a metallic reed 68 mounted on pivot member 69 in one wall of the rectangular body member 61 for oscillatory movement with respect to the metallic surface 66. The reed 68 is rigidly connected outside the chamber 60 to armature 70 of an alternating current driven vibratory device 71. The armature 70 is polarized by battery 72 and armature coil 73, and the actuating coils 74 and 75 are energized from an alternating current supply 76. Signals produced upon contact potential variations are applied through shielded cable 77 to a multi-stage amplifier 78, the bias of which is controlled by a potentiometer device 79. The alternating current output of the amplifier 78 is rectified by a device including a polarized relay 80 synchronized by the alternating current supply 76. The relay 80 includes a synchronous armature 81 and cooperating contact terminals 82 and 83 connected to the amplifier output. A condenser 84, of large capacity, is provided to filter the rectified current. The rectified current is applied to control grid 86 of a triode vacuum tube 87. The vacuum tube 87 controls current flow from a battery 88 through the metallic surface 66 to increase the temperature thereof in accordance with the rectified amplifier output. Bias for the tube 87 is provided by a potentiometer device 89 coupled to the cathode thereof.

The electrical temperature indicating device comprises a bridge network 90 including the metallic surface 66 as an arm thereof and a standard resistance 91 against which the resistance of the metallic surface 66 is compared. For the latter purpose a variable resistor 92 is connected in parallel with the standard resistance 91 to effectuate a balanced condition indicated by the meter 93. The variable resistor 92 may be calibrated in temperature degrees to provide a direct indication of saturation and precipitation temperatures.

In operation, the contact potential measuring means and associated circuits maintain the metallic surface 66 at a temperature substantially equal to the dew or frost point temperature in a manner corresponding to operation of the Fig. 1 apparatus. In the instant embodiment however, the temperature of the metallic surface 66 is increased to evaporate condensation or precipitation therefrom by current flow therethrough controlled by the tube 87 in accordance with the rectified amplifier output. Also, the dew or frost point temperature indication is obtained as a direct measurement of the temperature of the metallic surface 66 through operation of the bridge network 90. This arrangement is capable of rapidly providing accurate temperature indications.

There is thus provided by the present invention a novel apparatus for measuring temperatures and more particularly for measuring dew and frost point temperatures. Apparatuses embodying the principles of the present invention overcome inherent defects present in the prior dew and frost point meters and provide rapid, absolute temperature indications. The apparatuses are further characterized in that they may be readily employed for measuring dew or frost point temperatures, and are capable of continuous, automatic operation thus allowing their use in connection with recording instruments to provide a continuous record of changing atmospheric conditions throughout any desired period of time.

Although two embodiments of the present invention have been disclosed and described herein it is expressly understood that various changes and substitutions may be made therein without departing from the spirit of the invention as well understood by those skilled in the art. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. A device for determining the moisture condition of a gas in a circulatory system comprising a first metallic surface subject to said gas, cooling means for said first surface, a second metallic surface disposed to be intermittently in close proximity to said first surface to develope a contact potential in response to the formation of a single molecular layer of condensation on said first surface, potential variation detecting means electrically connected across said surfaces and means measuring the temperature of said first surface.

2. A device for determining the moisture condition of a gas in a circulatory system comprising a first metallic surface subject to said gas, cooling means for said first surface, a second metallic surface subject to said gas and in close proximity to but not touching said first surface to develope a contact potential in response to the formation of a single molecular layer of condensation on said first surface, means for maintaining said second surface at the temperature of said gas, potential variation detecting means electrically connected across said surfaces and means measuring the temperature of said first surface.

3. A device for determining the moisture condition of a gas in a circulatory system comprising a first metallic surface subject to said gas, cooling means for said first surface, a rotatably mounted second metallic surface disposed to be intermittently in close proximity to said first surface to develope a contact potential in response to the formation of a single molecular layer of condensation on said first surface, potential variation detecting means electrically connected across said surfaces, and means measuring the temperature of said first surface.

4. A device for determining the moisture condition of a gas in a circulatory system comprising a first metallic surface subject to said gas, cooling means for said first surface, a plurality of electrically connected and rotatably mounted metallic vanes disposed to be consecutively in close proximity to said first surface to develope a contact potential in response to the formation of a single molecular layer of condensation on said first surface, potential variation detecting means electrically connected across said surface and said vanes, and means measuring the temperature of said first surface.

5. A device for determining the moisture condition of a gas in a circulatory system comprising a first metallic surface subject to said gas, cooling means for said first surface, a second metallic surface disposed in close proximity to said first surface to develope a contact potential in response to the formation of a single molecular layer of condensation on said first surface, an adjustable voltage source connected across said surfaces, potential variation detecting means connected between said source and said first surface, and means measuring the temperature of said first surface.

6. A device for determining the moisture condition of a gas in a circulatory system comprising a first metallic surface subject to said gas, cooling means for said first surface, a second metallic surface disposed in close proximity to said first surface to develope a contact potential in response to the formation of a single molecular layer of condensation on said first surface, potential variation detecting and amplifying means electrically connected across said surfaces, a heating means in close proximity to said first surface and capable of raising the temperature of said first surface, controlling means actuated by said amplifying means in response to a potential variation between said surfaces for energizing and de-energizing said heating means, and means measuring the temperature of said first surface.

7. A device for determining the moisture condition of a gas in a circulatory system comprising a first metallic surface subject to said gas, cooling means for said first surface, a second metallic surface disposed in close proximity to said first surface to develope a contact potential in response to the formation of a single molecular layer of condensation on said first surface, potential variation detecting and amplifying means electrically connected across said surfaces, a heating means disposed in close proximity to said first surface and capable of raising the temperature of said first surface, relay operated switching means actuated by said amplifying means in response to a potential variation at said first surface for energizing and de-energizing said heating means, and means for measuring the temperature of said first surface.

8. A device for determining the moisture condition of a gas in a circulatory system comprising a first metallic surface subject to said gas, cooling means for said first surface, a second metallic surface disposed in close proximity to said first surface to develope a contact potential in response to the formation of a single molecular layer of condensation on said first surface, potential variation detecting and amplifying means electrically connected across said surfaces, a heating means including an adjustable voltage source disposed in close proximity to said first surface and capable of raising the temperature of said first surface, controlling means actuated by said amplifying means in response to a potential variation at said first surface for energizing and de-energizing said heating means, and means measuring the temperature of said first surface.

9. A device for determining the moisture condition of a gas in a circulatory system comprising a first metallic surface subject to said gas, cooling means for said first surface, a second metallic surface disposed in close proximity to said first surface to develope a contact potential in response to the formation of a single molecular layer of condensation on said first surface, potential variation detecting means electrically connected across said surfaces, a potential measuring means electrically connected to said detecting means for determining the magnitude of a potential variation between said surfaces, and means measuring the temperature of said first surface.

10. A device for determining the moisture condition of a gas in a circulatory system comprising a first metallic surface subject to said gas, cooling means for said first surface, a rotatably mounted second metallic surface disposed to be intermittently in close proximity to said first surface to develope a contact potential in response to the formation of a single molecular layer of condensation on said first surface, potential variation detecting means electrically connected across said surfaces, a heating means, a potential measuring means, a switching means synchronous with the movement of said second surface permitting a periodic energization of said heating means and operation of said potential measuring means, and means measuring the temperature of said first surface.

11. A device for determining the moisture condition of a gas in a circulatory system comprising a first metallic surface subject to said gas, cooling means for said first surface, a rotatably mounted second metallic surface disposed to be intermittently in close proximity to said first surface to develope a contact potential in response to the formation of a single molecular layer of condensation on said first surface, potential variation detecting means electrically connected across said surfaces, a heating means, a potential measuring means, a switching means synchronous with the movement of said second surface including a spring switch member permitting a periodic energization of said heating means and operation of said potential measuring means, and means measuring the temperature of said first surface.

12. A device for determining the moisture condition of a gas in a circulatory system comprising a first metallic surface subject to said gas, cooling means for said first surface, a rotatable shaft, a second metallic surface subject to said gas and mounted on said shaft disposed to be intermittently in close proximity to said first surface to develope a contact potential in response to the formation of a single molecular layer of condensation on said first surface, a heating means connected across said surface, a potential measuring means connected across said surfaces, a switching means synchronous with the movement of said second surface comprising a cam mounted on said shaft and a spring switch member permitting a periodic energization of said heating means and operation of said potential measuring means and means measuring the temperature of said first surface.

13. A device for determining the moisture condition of a gas comprising a gas circulatory system, a first metallic surface subject to said gas, cooling means for said first surface, a second metallic surface subject to said gas and disposed in close proximity to said first surface to develope a contact potential in response to the formation of a single molecular layer of condensation on said first surface, potential variation detecting means electrically connected across said surfaces and means measuring the temperature of said first surface.

14. A device for determining the moisture condition of a gas comprising a gas circulatory system, and an anti-condensation heating element disposed in the gas circulation path thereof, a first metallic surface subject to said gas, cooling means for said first surface, a second metallic surface subject to said gas and disposed in close proximity to said first surface to develope a contact potential in response to the formation of a single molecular layer of condensation on said first surface, potential variation detecting means electrically connected across said surfaces and means measuring the temperature of said first surface.

15. A device for determining the moisture condition of a gas in a circulatory system comprising a surface, means for cooling said surface, a thin metallic plate exposed to said gas and mounted on said surface in heat transferring relation and electrically insulated therefrom, a vibrating metallic reed mounted for movement relative to said plate, potential variation detecting means electrically connected across said plate and said reed and means measuring the temperature of said plate.

16. A device for determining the moisture condition of a gas in a circulatory system comprising a metallic surface subject to said gas, cooling means for said surface, a vibrating metallic reed mounted for movement relative to said surface, a vibrating means for said reed including an armature, armature coils, a battery and an alternating current source, potential variation detecting means electrically connected across said surface and said reed and electric current source to heat said metallic surface, a polarized relay means responsive to said detecting means to connect said current source to said surface to control the temperature of said metallic surface, and electronic means comprising a bridge network for measuring the temperature of said surface.

ROSS GUNN.

References Cited in the file of this patent

UNITED STATES PATENTS

| Number | Name | Date |
|---|---|---|
| 2,376,209 | Turin | May 15, 1945 |
| 2,466,696 | Friswold et al. | Apr. 12, 1949 |
| 2,536,111 | Van Dyke | Jan. 2, 1951 |